United States Patent
Day et al.

(10) Patent No.: US 6,405,196 B2
(45) Date of Patent: Jun. 11, 2002

(54) SYSTEM AND METHOD FOR INTERFACING INDEX BASED AND ITERATOR BASED APPLICATION PROGRAMMING INTERFACES

(75) Inventors: Mark S. Day, Saratoga; Donald J. Brady; Deric S. Horn, both of San Jose, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/866,116

(22) Filed: May 25, 2001

Related U.S. Application Data

(62) Division of application No. 09/216,602, filed on Dec. 17, 1998, now Pat. No. 6,282,536.

(51) Int. Cl.$^7$ .............................................. G06F 17/30
(52) U.S. Cl. ................................... 707/4; 707/5; 707/3
(58) Field of Search ...................................... 707/1–206

(56) References Cited

U.S. PATENT DOCUMENTS 5,978,951 A * 11/1999 Lawler et al. .............. 714/758
6,000,006 A * 11/1999 Bruce et al. ................ 711/103

* cited by examiner

Primary Examiner—Maria N. Von Buhr
(74) Attorney, Agent, or Firm—Blakely, Sokoloff, Taylor & Zafman

(57) ABSTRACT

A system and method for interfacing index based and iterator based file management routines. In general, the disclosed system maintains an iterator cache having multiple iterators. Each active iterator is associated with a most recently used directory entry. Upon receiving an index based request, the iterator closest to the index based request is identified. If the index based request is closer to the top of the directory than it is to the closest active iterator, the directory entries are sequentially examined beginning at the top of the directory with the first entry. Otherwise, the system determines whether the index based request is located above or below the closest iterator. If the index based request is above the closest iterator, the system steps backward beginning with the directory entry associated with the closest iterator until the directory entry associated with the index based request is located. If the closest iterator is located below the closest iterator, the system steps forward through the directory entries beginning with the directory entry associated with the closest iterator until the requested directory entry is located.

12 Claims, 3 Drawing Sheets

SYSTEM AND METHOD FOR INTERFACING INDEX BASED AND ITERATOR BASED APPLICATION PROGRAMMING INTERFACES

This application is a divisional of co-pending U.S. Pat. application Ser. No. 09/216,602 filed Dec. 17, 1998 now U.S. Pat No. 6,282,536.

BACKGROUND OF THE INVENTION

1. Field of the Invention

The present invention relates generally to accessing files stored on a storage volume via application programming interfaces, and more particularly to interfacing index based and iterator based application programming interfaces.

2. Description of the Background Art

Computer file management routines for accessing directory entries in file systems are typically either index based or iterator based. Index based file management routines access directory entries according to an index number, normally an integer, associated with a particular entry. Iterator based routines, in contrast, access directory entries suing an iterator, which contains state information.

Index based routines, in some implementations, begin searching at the beginning (or at the "top") of the directory each time an index based search request is received. Because this implementation is typically highly inefficient, improved index based routines have been developed that record a single most recently used (MRU) index. The MRU index is usually maintained internally, which tends to limit the number of clients that can effectively use the index based routine during the same time period. Indeed, conventional index based routines maintain a single MRU per directory. Such, index based routines that merely record the MRU index can be problematic where more than one application is accessing the same directory at substantially the same time or where an application is accessing multiple directories at substantially the same time.

In the circumstance where multiple applications are accessing entries of a single directory at substantially the same time, the MRU index of one application may be replaced by the MRU index of another application. Thus, because only a single MRU index is recorded, one application may be relying on the index most recently used by another application instead of on its own MRU index and vice versa, thus frustrating any advantage obtained by recording the MRU index.

A similar problem arises where a single application is accessing multiple directories during the same time period. In this circumstance, where the MRU index is within one directory, and the application then needs to access an entry located in another directory, the index based routine will begin searching from the first entry in the other directory without the benefit of a MRU index within that directory. This, again, frustrates any advantage obtained by maintaining a single MRU index.

As mentioned above, iterator based routines access a requested directory entry using state information based on an iterator associated with the MRU directory entry. An iterator has three primary operations, namely (1) initialize, or point to the first item in the directory; (2) go to the next item in the directory; and (3) go to the previous item in the directory. Since the client maintains the state information, multiple clients can simultaneously access a directory using their own iterator. The iterator based routine, then, locates the requested entry by beginning at the entry associated with the iterator and stepping forward or backward as necessary to reach the requested directory, thus obviating the need to begin searching at the beginning of the directory each time a directory entry is requested.

For example, instead of submitting an index based request in the form of an integer, an iterator based routine typically receives a request for a directory entry with reference to an iterator associated with the most recently used entry. With the iterator as a reference, the requested entry may then be located by merely stepping up or down the directory from the iterator.

A problem arises, however, where an index based Applications Programming Interface (API), which does not use state information, is associated with an iterator based file management routine or an iterator based API, which does use state information. In this circumstance, the index based API requests a directory entry from an iterator based API or file manager by submitting an index based request in the form of an integer. Upon receipt of an index based request, conventional iterator based routines typically resort to the considerably less efficient index based approach and begin with the first directory entry and step through each entry until the requested entry is found. This approach has been largely unsatisfactory in that it is highly inefficient and, therefore, may cause significant performance problems.

Consequently, a need exists to provide a system and method for effectively and efficiently interfacing index based and iterator based file management routines. Moreover, a need exists for a system and method by which a directory entry may be accessed effectively and efficiently by an iterator based file management routine from an index based request.

SUMMARY OF THE INVENTION

The present invention overcomes or substantially alleviates prior problems associated with interfacing index based and iterator based routines. In general, the present invention maintains an iterator cache memory having multiple iterators. Each active iterator is associated with a specific directory entry. Upon receiving an index based request, the iterator closest to the index based request is identified. Once the closest iterator is identified, directory entries are examined sequentially beginning with the directory entry associated with the closest iterator and continuing until the directory entry associated with the index based request is located. In this manner, iterator based routines may efficiently locate directory entries from index based requests with a higher efficiency than by sequencing through all the directory entries beginning from the first directory entry each time an index based request is received.

The iterator closest to the index based request is determined by calculating the absolute value of the difference between the index based request and an index number associated with each active iterator in the iterator cache. The active iterator having the smallest absolute value difference is deemed to be the iterator closest to the index based request.

Preferably, where the index based request is closer to the first directory entry than to the closest active iterator, the invention initializes an iterator and sequences through the directory entries beginning with the first directory entry rather than with the closest directory entry. In other words, in this embodiment, where the directory entry associated with the index based request is farther away (in absolute distance) from the closest active iterator than from the first directory entry, the invention begins to search sequentially beginning from the first directory entry instead of from the closest iterator.

In practice, it has been found that many applications tend to request directory entries in a substantially sequential fashion. That is, for example, after having just requested the twenty-fifth directory entry, an application will typically next request the twenty-sixth, or perhaps the twenty-seventh, directory entry. It is much less likely, in practice, for an application to request the sixteenth entry immediately following a request for the twenty-fifth entry.

Thus, by maintaining an iterator at the most recently used entry, the next entry may be quickly and efficiently accessed by sequencing through the directory entries beginning at that most recently used entry. Similarly, by stepping sequentially through the directory entries beginning with the first entry only when the closest iterator farther from the requested entry than the first entry, the invention permits entries near the top of the directory, or elsewhere within the directory, to be located efficiently. Further, by maintaining multiple iterators within an iterator cache, many problems associated with interfacing index based and iterator based routines are overcome or substantially alleviated.

Other advantages and features of the present invention will be apparent from the drawings and detailed description as set forth below.

DETAILED DESCRIPTION OF THE PREFERRED EMBODIMENT

Figure 1:
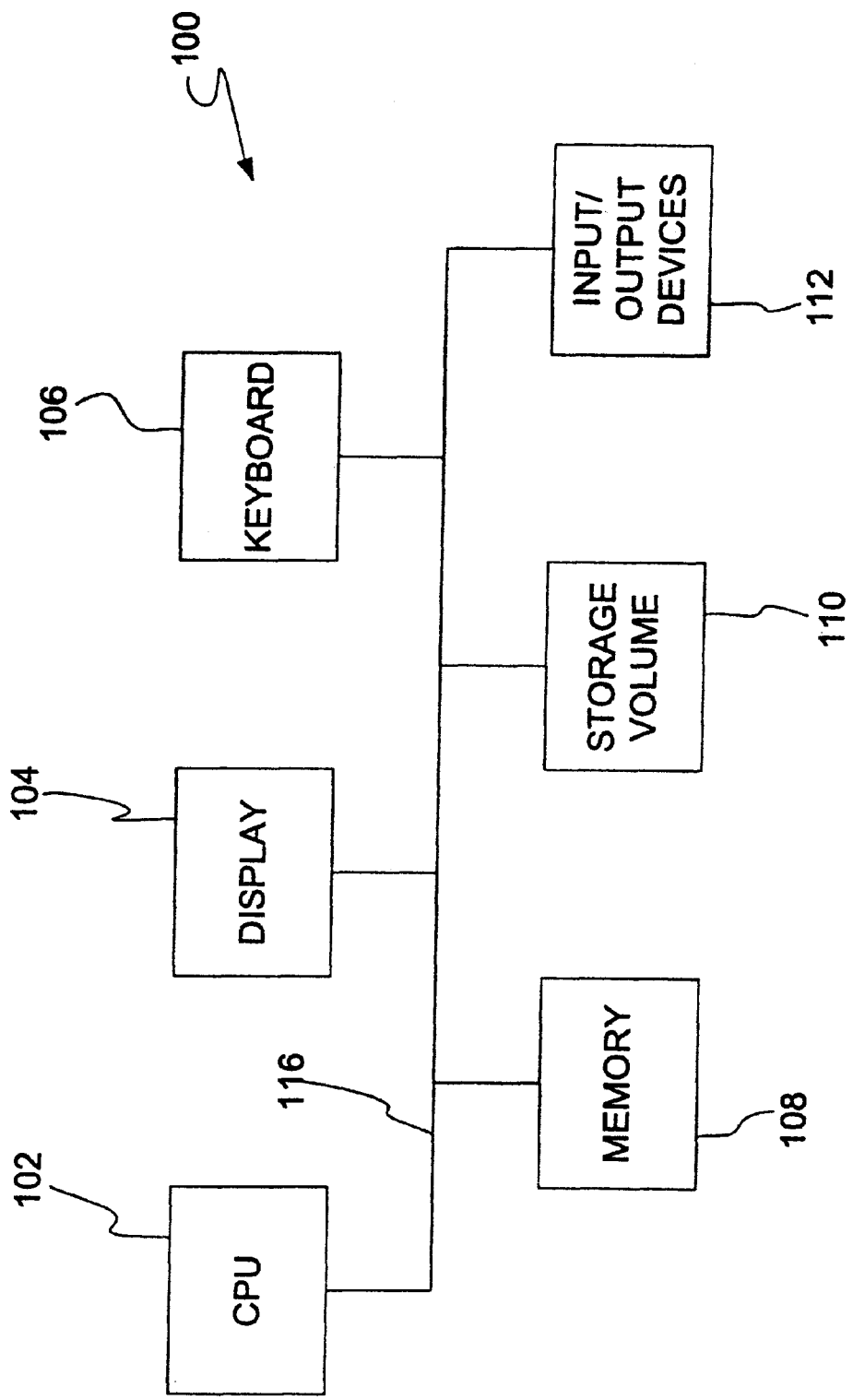
FIG. 1 is a block diagram of a computer system for interfacing index based and iterator based routines and for accessing a directory entry from an index based request using an iterator based routine according to the present invention.

FIG. 1 shows a computer system 100 for interfacing index based and iterator based routines according to the present invention. Using the system 100, a directory entry may be accessed from an index based request using an iterator based routine. As illustrated, the system 100 includes a central processing unit (CPU) 102, a display 104, a keyboard 106, a memory 108, a storage volume 110, and input/output devices 112 coupled via a bus 116.

Figure 2:
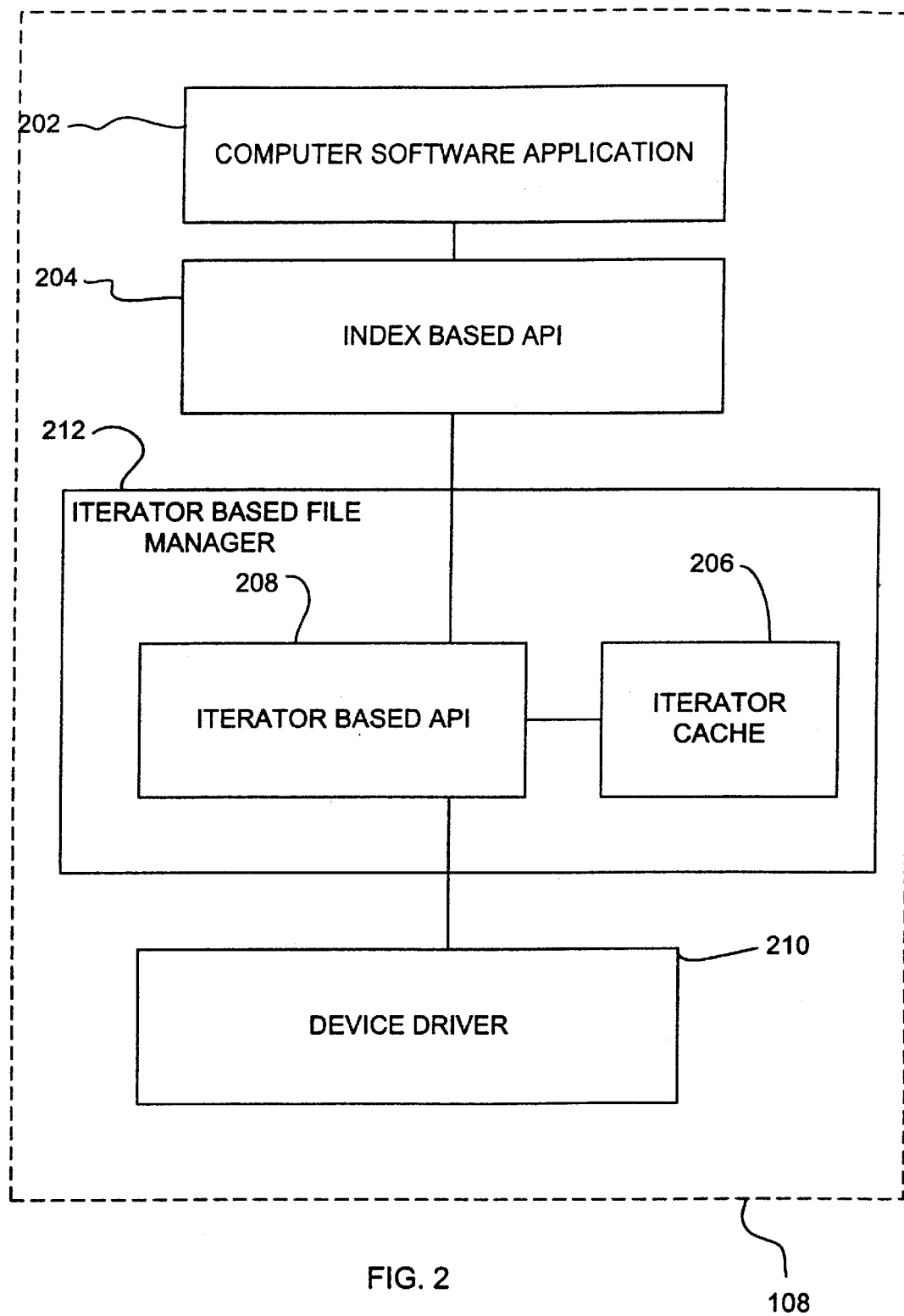
FIG. 2 is a block diagram of the memory of the computer system of FIG. 1.

FIG. 2 illustrates, in more detail, the memory 108 of FIG. 1. As shown, the memory 108 generally includes a computer software application 202, an index based API 204, an iterator based file manager 212, and a device driver 210. The iterator based file manager 212 further includes an iterator based API 208 and an iterator cache memory 206. The iterator cache memory 206 contains iterators, or objects, for a subset of the directories on the storage volume 110. The device driver 210 reads data from and writes data to the storage volume 110 (FIG. 1).

In general, the application 202 requests via the index based API 204 a directory entry stored on the storage volume 110 (FIG. 1) from the iterator based file manager 212. In response, the index based API 204 sends an index based request, in the form of an integer, to the iterator based file manager 212, within which the iterator based API 208 receives the index based request.

Each active iterator within the iterator cache memory 206 is associated with a specific directory entry. Advantageously, an iterator is maintained in association with the most recently used directory entry so that the next directory entry, or another directory entry near the most recently used directory entry, may be accessed quickly as discussed below. Because several applications may be simultaneously accessing a given directory, it is preferable that the iterator cache include multiple iterators so that an active iterator may be maintained in association with the most recently used directory entry for each application accessing the directory. When all available iterators are in active use and an additional iterator is needed, the least recently used iterator is invalidated or deactivated and, then, revalidated or reactivated and associated with a new requested entry.

Additionally, when an entry is added to or deleted from a given directory, all active iterators within that directory are inactivated, or invalidated, in response to the addition or deletion. The inactivated iterators are then reactivated or revalidated, one at a time, by associating a previously deactivated iterator with new requested entries.

Alternatively, to maintain each active iterator associated with the same entry regardless of whether entries have been added or deleted in the directory, the active iterators may be shifted up or down, as necessary, in response to the addition or deletion of entries. In other words, the index associated with an iterator may need to be incremented or decremented to maintain the iterator associated with the same directory entry. Further, if the entry associated with an active iterator is deleted, the active iterator can be changed so that it is associated with either the directory immediately preceding or following the deleted entry.

Each active iterator advantageously contains the information necessary to directly locate the particular associated directory entry within its directory. Typically, this information may comprise the name of the directory entry or a block number and offset into the block depending on the volume format. As such, upon receiving an index based request, the iterator based API 208 may use the cache memory 206 to determine which iterator is the closest to the entry referred to by the index based request and send information regarding the closest iterator to the iterator based API 208.

Upon receipt of the index based request, the iterator based API 208 identifies the active iterator within the iterator cache memory 206 that is closest to the index based request. In a presently preferred embodiment, the iterator based API 208 determines which active iterator within the iterator cache memory 206 is closest to the index based request by calculating the absolute value difference between each active iterator within the cache and the index based request. The active iterator having the smallest absolute value difference is deemed to be the closest active iterator.

Then, if the closest active iterator position is less than, i.e. above, or equal to the index based request, the iterator based API 208 sequentially steps the iterator through the directory entries, beginning with the directory entry associated with the active iterator closest to the index based request. The iterator based API 208 continues to step the iterator sequentially through the directory entries stored in the storage volume 210 until it arrives at the requested directory entry associated with the index based request. Upon the iterator arriving at the requested directory entry, the directory entry may be accessed by the iterator based API 212.

For example, if an index based request is for the twenty-fifth directory entry and the closest active iterator is positioned at, or associated with, the twenty-third directory entry, the iterator based API 208 begins to step sequentially through the directory entries commencing with the twenty-third directory entry. The iterator based API 208 starts at the twenty-third directory entry and steps forward, or down the directory, twice to arrive at the requested twenty-fifth entry.

In practice, it has been found that many applications frequently request directory entries in a substantially sequential manner. That is, after requesting a particular directory entry, many applications will frequently request the succeeding directory entry or a directory entry a short distance below the last requested, or most recently used, directory entry. In contrast, it is less often that an application requests an entry above, or prior to, the most recently used entry as discussed below. Consequently, by starting the search for a particular directory entry that is below the most recently used directory entry at the most recently used entry, the likelihood that the requested directory entry is either the next directory entry or just a few directory entries below is quite high.

If, however, the requested index is closer to the index associated with the first entry in the directory than to the closest active iterator, then an inactive iterator (or the least recently used active iterator, if there are no inactive iterators) is initialized to point to the first item in the directory. Iteration then proceeds down the directory (to higher indices) until the desired entry is located. Hence, in the preferred embodiment, if the closest active iterator is located farther from the index based request than the first directory entry, the iterator based API 208 will sequentially step through directory entries from the top of the directory, beginning with the first directory entry.

For example, if an index based request is for the third directory entry while the closest active iterator is positioned at the twenty-ninth directory entry, the iterator based API 208 begins with the first directory entry and steps sequentially through the directory entries. The iterator based API 208 starts at the top of the directory with the first directory entry and steps forward, or down the directory, three times until arriving at the requested third directory entry. Indeed, in practice, it has been observed that, if the requested index is not very near the index most recently used by a given piece of code, then it is quite likely that the requested index is for the first directory entry.

Lastly, when the iterator arrives at the directory entry associated with the index based request, the iterator based file manager 212 accesses the requested directory entry in accordance with normal file manager protocol. The accessed requested directory entry is now the most recently used directory entry. Similarly, the former most recently used directory entry is no longer the most recently used directory entry.

Figure 3:
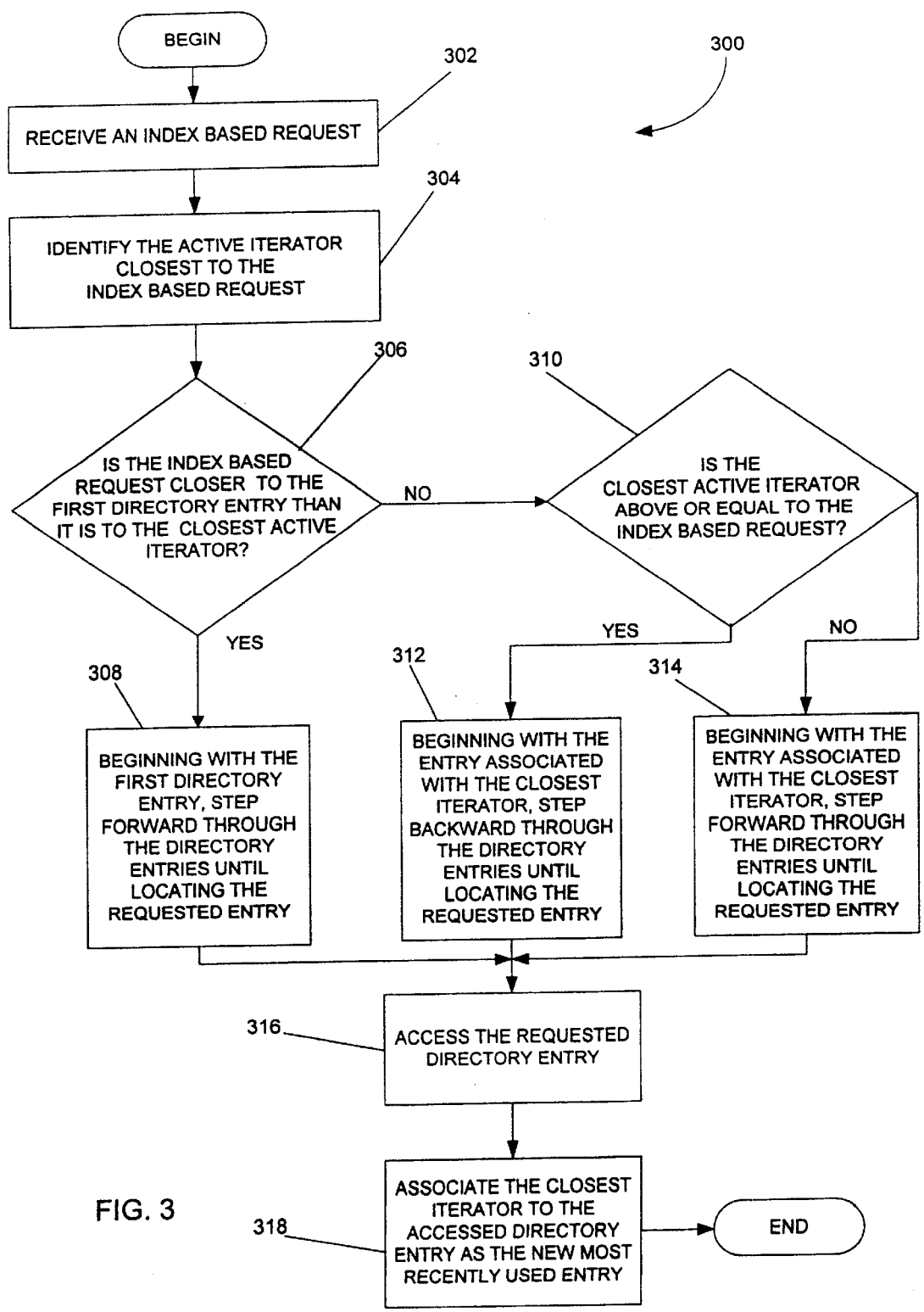
FIG. 3 is a flowchart illustrating a method of interfacing index based and iterator based routines and for retrieving a directory entry from an index based request using an iterator based routine in accordance with the invention.

FIG. 3 is a flowchart that illustrates the method 300 of the present invention. First, as represented by block 302, the iterator based file manager receives an index based request. As discussed above, the index based request is received by the iterator based file manager 212 (FIG. 2) from the index based API 204.

Upon receiving the index based request, the next task for the file manager 212, as indicated by block 304, is to identify the active iterator closest to the index based request which, as discussed above is the active iterator with the smallest absolute value difference in position from the entry identified by index based request.

Next, as represented by decision block 306, the file manager 212 determines whether the index based request is closer to the first directory entry (minimum index) than it is to the closest active iterator. If the index based request is associated with an index number closer to the first directory entry or the top of the directory, the iterator based API 208 (FIG. 2) continues as indicated in block 308. In particular, block 308 begins to step an initialized iterator sequentially through the directory entries beginning with the first directory entry until the requested directory entry is located.

It should be noted that where the index based request is larger than the index associated with the last entry in the directory (the entry associated with the largest index), the iterator should be immediately deactivated. That is, if the iterator based API 208 (FIG. 2) arrives at the last directory entry before arriving at the entry associated with the index based request, the iterator (now at the bottom of the directory) is deactivated so as to be available to be reactivated and reassigned. In this manner, the next time the file manager 212 arrives at block 308, the deactivated iterator may be reactivated or initialized and associated with the first directory entry.

If, pursuant to the decision of block 306, the file manager 212 (FIG. 2) determines that the index based request is not closer to the first directory entry than it is to the closest active iterator, then the closest iterator proceeds to step 310. In step 3 10, the file manager 212 determines whether the closest active iterator is above or equal to the index based request. That is, the file manager 212 determines whether the index number associated with the closest active iterator is less than or equal to that of the index based request.

The outcome of decision step 310 dictates whether the iterator based API 208 (FIG. 2) will step from the closest active iterator sequentially backwards (up the directory) as indicated by block 312, or will step from the closest active iterator sequentially forward (down the directory) as indicated by block 314. In particular, if the outcome of test 310 is "yes" (the closest active iterator is associated with an index number less than or equal to that of the index based request), then the iterator based API 108 proceeds in accordance with block 312. As represented by block 312, the iterator based API 208 begins at the directory entry associated with the closest active iterator and, then, steps backward (up the directory) through the directory entries until locating the requested entry.

As represented by block 314, if the outcome of the decision block 310 is "no," then the iterator based API 208 (FIG. 2) proceeds in accordance with the block 314. Pursuant to block 314, the iterator based API 208 begins at the entry associated with the closest active iterator and steps sequentially forward (down the directory) through the directory entries until locating the requested entry.

After the iterator based API 208 (FIG. 2) has located the requested directory entry pursuant to any one of blocks 308, 312, or 314, the iterator based API 208 accesses the requested directory entry as indicated in block 316. Lastly, as represented by block 318, the closest iterator, as determined above, is shifted into association with the requested directory entry to maintain an iterator associated with the most recently used directory entry. In this manner, an iterator is maintained at the most recently used directory entry.

As discussed above, because several applications can be accessing the same directory during the same time period, there are advantageously multiple iterators within the iterator cache memory 206. The iterators are preferably stored in the iterator cache memory 106 in a list. The ordering of the list is based on how recently each iterator was used. The most recently used iterator is positioned at the top of the list;

the least recently used iterator is positioned on the bottom of the list. When an iterator is used, it is moved to the top of the list, since it is now the most recently used iterator. Maintaining the iterators in a list according to how recently each has been used facilitates, among other things, identification of the least recently used or inactive iterators since they are positioned at the bottom of the list.

The invention has been described above with reference to a specific embodiment. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method of locating a directory entry, comprising the steps of:
   providing a cache memory storing a plurality of iterators;
   receiving an index based request for a directory entry;
   identifying an iterator within the cache memory that is closest to the entry associated with the index based request; and
   stepping through a set of directory entries beginning at a directory entry corresponding to the iterator closest to the index based request until locating a directory entry corresponding with the index based request.

2. The method of claim 1 wherein the step of identifying further comprises:
   calculating an absolute value difference between the positions of each of a plurality of iterators within the cache memory and the index based request; and
   selecting from the plurality of iterators, the iterator having the smallest absolute value difference between its position and the position of the entry associated with the index based request.

3. The method of claim 2 wherein the step of stepping steps sequentially through the directory entries a number of times equal to the smallest absolute value difference between the closest iterator and the index based request.

4. The method of claim 1, further comprising the step of accessing the entry associated with the iterator closest to the index based request if the entry associated with the iterator closest to the index based request is the entry associated with the index based request.

5. The method of claim 1, further comprising the steps of determining relative positions of the closest iterator and the index based request, wherein the if the closest iterator is positioned above the position of the entry associated with the index based request stepping forward through the directory entries and if the closest iterator is positioned below the position stepping backward through the directory entries.

6. The method of claim 1, further comprising the steps of:
   invalidating all iterators within the cache when a directory entry is added to the set of directory entries and when a directory entry is deleted from the set of directory entries; and
   revalidating a previously invalidated iterator and associating it with a most recently used directory entry.

7. A method of locating an entry in a directory, comprising the steps of:
   providing a cache memory storing a plurality of iterators;
   receiving an index based request for a directory entry;
   identifying an iterator within the cache memory that is closest to the entry associated with the request;
   determining whether the entry associated with the request is closer to a first directory entry within the directory than to the closest iterator;
   if the requested entry is closer to a first entry within the directory than to the closest iterator then stepping forward through a set of directory entries beginning at the first directory entry within the directory until locating a directory entry corresponding with the request;
   if the entry is located above the closest iterator and is closer to the closest iterator than to the first directory entry then stepping backwards through the set of directory entries beginning at the directory entry corresponding to the iterator closest to the index based request until locating the directory entry corresponding with the index based request;
   else stepping forward through the set of directory entries beginning at a directory entry corresponding to the iterator closest to the requested until locating the directory entry corresponding with the index based request.

8. The method of claim 7 wherein the step of identifying further comprises:
   calculating an absolute value difference between the positions of each of a plurality of iterators and the position of the requested entry; and
   selecting from the plurality of iterators the iterator having the smallest absolute value difference between its position and the position of the requested entry.

9. The method of claim 7 wherein the step of receiving is performed by an iterator based application programming interface.

10. A computer-readable medium containing instructions for causing a computer to interface an index based routine and an iterator based routine by performing the steps of:
    providing a cache memory storing a plurality of iterators;
    receiving an index based request for a directory entry;
    identifying an iterator within the cache memory that is closest to the entry associated with the index based request; and
    stepping through a set of directory entries beginning at a directory entry corresponding to the iterator closest to the index based request until locating a directory entry corresponding with the index based request.

11. The computer-readable medium of claim 10, further comprising the steps of determining relative positions of the closest iterator and the index based request, wherein if the closest iterator is positioned above the position of the entry associated with the index based request stepping forward through the directory entries and if the closest iterator is positioned below the position of the entry associated with the index based request stepping backward through the directory entries.

12. A system for interfacing index based and iterator based routines, comprising:
    cache memory means for storing a plurality of iterators;
    means for receiving an index based request for a directory entry;
    means for identifying an iterator within the cache memory that is closest to the entry associated with the index based request; and
    means for stepping through a set of directory entries beginning at a directory entry corresponding to the iterator closest to the index based request until locating a directory entry corresponding with the index based request.

* * * * *